United States Patent
Jiang et al.

(10) Patent No.: US 10,782,119 B2
(45) Date of Patent: Sep. 22, 2020

(54) OBJECT DIMENSION MEASUREMENT METHOD AND APPARATUS

(71) Applicant: Huawei Technologies Co., Ltd., Shenzhen (CN)

(72) Inventors: Xiuping Jiang, Wuhan (CN); Hui Yi, Wuhan (CN); Yusi Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/550,719

(22) PCT Filed: Feb. 11, 2015

(86) PCT No.: PCT/CN2015/072723
§ 371 (c)(1),
(2) Date: Aug. 11, 2017

(87) PCT Pub. No.: WO2016/127328
PCT Pub. Date: Aug. 18, 2016

(65) Prior Publication Data
US 2018/0045504 A1    Feb. 15, 2018

(51) Int. Cl.
*G01B 11/02* (2006.01)
*G01B 11/14* (2006.01)
(Continued)

(52) U.S. Cl.
CPC .............. *G01B 11/02* (2013.01); *G01B 11/14* (2013.01); *G01B 11/26* (2013.01); *G06T 7/62* (2017.01);
(Continued)

(58) Field of Classification Search
CPC ......... G01B 11/02; G01B 11/14; G01B 11/26; G06T 7/62; H04N 5/23245; H04N 5/23293; H04N 5/23296
See application file for complete search history.

(56) References Cited

U.S. PATENT DOCUMENTS

2008/0018880 A1    1/2008  Matsuo et al.
2010/0142802 A1*   6/2010  Lee ........................ G01B 11/03
                                                     382/154
(Continued)

FOREIGN PATENT DOCUMENTS

CA       1229975 A    12/1987
CN     101101209 A     1/2008
(Continued)

OTHER PUBLICATIONS

Foreign Communication From a Counterpart Application, European Application No. 15881490.5, Extended European Search Report dated Dec. 5, 2017, 7 pages.
(Continued)

*Primary Examiner* — Farzana Hossain
(74) *Attorney, Agent, or Firm* — Conley Rose, P.C.

(57) ABSTRACT

An object dimension measurement method and apparatus, where the object dimension measurement method includes obtaining a horizontal distance between a photographing terminal and a photographed object or a vertical distance between the photographing terminal and a horizontal plane, obtaining a camera imaging angle when the photographing terminal photographs the photographed object, calculating a deflection angle of a camera in a vertical direction when the photographing terminal photographs the photographed object, obtaining through calculation an imaging distance of the photographed object on a display screen of the photographing terminal according to a trigonometric relationship among the horizontal distance or the vertical distance, the camera imaging angle, the deflection angle, and the imaging distance, and obtaining through conversion an actual dimension of the photographed object according to the imaging distance. Hence, an object dimension can be accurately measured without using a special measuring tool.

19 Claims, 6 Drawing Sheets

(51) Int. Cl.
*G01B 11/26* (2006.01)
*H04N 5/232* (2006.01)
*G06T 7/62* (2017.01)

(52) U.S. Cl.
CPC ..... *H04N 5/23245* (2013.01); *H04N 5/23296* (2013.01); *H04N 5/23293* (2013.01)

(56) References Cited

U.S. PATENT DOCUMENTS

| | | | |
|---|---|---|---|
| 2011/0157400 A1* | 6/2011 | Kim | H04N 5/23216 348/222.1 |
| 2011/0183684 A1* | 7/2011 | Kim | H04N 1/00323 455/456.1 |
| 2012/0169867 A1 | 7/2012 | Wang et al. | |
| 2016/0057352 A1 | 2/2016 | Yoneda et al. | |

FOREIGN PATENT DOCUMENTS

| | | |
|---|---|---|
| CN | 101672620 A | 3/2010 |
| CN | 101922928 A | 12/2010 |
| CN | 102564313 A | 7/2012 |
| CN | 102661717 A | 9/2012 |
| CN | 103139700 A | 6/2013 |
| CN | 103822597 A | 5/2014 |
| CN | 103852130 A | 6/2014 |
| CN | 104050669 A | 9/2014 |
| CN | 104184995 A | 12/2014 |
| CN | 104236462 A | 12/2014 |
| WO | 8504245 A1 | 9/1985 |
| WO | 2012013914 A1 | 2/2012 |
| WO | 2014156731 A1 | 10/2014 |

OTHER PUBLICATIONS

Machine Translation and Abstract of Chinese Publication No. CN101922928, Dec. 22, 2010, 34 pages.
Machine Translation and Abstract of Chinese Publication No. CN102661717, Sep. 12, 2012, 14 pages.
Machine Translation and Abstract of Chinese Publication No. CN103139700, Jun. 5, 2013, 36 pages.
Machine Translation and Abstract of Chinese Publication No. CN103852130, Jun. 11, 2014, 10 pages.
Machine Translation and Abstract of Chinese Publication No. CN104050669, Sep. 17, 2014, 11 pages.
Foreign Communication From a Counterpart Application, PCT Application No. PCT/CN2015/072723, English Translation of International Search Report dated Jul. 2, 2015, 2 pages.
Foreign Communication From a Counterpart Application, PCT Application No. PCT/CN2015/072723, English Translation of Written Opinion dated Jul. 2, 2015, 8 pages.
Machine Translation and Abstract of Chinese Publication No. CN101672620, Mar. 17, 2010, 13 pages.
Machine Translation and Abstract of Chinese Publication No. CN102564313, Jul. 11, 2012, 6 pages.
Foreign Communication From a Counterpart Application, Chinese Application No. 201580054481.7, Chinese Office Action dated Aug. 24, 2018, 12 pages.
Machine Translation and Abstract of Chinese Publication No. CN103822597, May 28, 2014, 9 pages.
Machine Translation and Abstract of Chinese Publication No. CN104184995, Dec. 3, 2014, 38 pages.
Machine Translation and Abstract of Chinese Publication No. CN104236462, Dec. 24, 2014, 9 pages.
Foreign Communication From a Counterpart Application, Chinese Application No. 201580054481.7, Chinese Notice of Rejection dated Dec. 24, 2019, 11 pages.

* cited by examiner

OBJECT DIMENSION MEASUREMENT METHOD AND APPARATUS

CROSS-REFERENCE TO RELATED APPLICATION

This application is a U.S. National Stage of International Patent Application No. PCT/CN2015/072723 filed on Feb. 11, 2015, which is hereby incorporated by reference in its entirety.

TECHNICAL FIELD

The present disclosure relates to the field of communications terminal technologies, and in particular, to an object dimension measurement method and apparatus.

BACKGROUND

In some other approaches, there are following common object dimension measurement methods.

(1) Distance Measurement Using a Measure Gauge.

Using a measure gauge to directly measure a distance between two points is classified into distance measurement using a steel ruler and distance measurement using an invar baseline tape. A steel ruler is made of a thin steel tape, and generally has a length of 20 meters, 30 meters, or 50 meters. When a distance to be measured is longer than a length of a ruler, a straight line needs to be first demarcated and then measurement is performed in sections. Precision of distance measurement using a steel ruler is generally higher than 1/1000. An invar baseline tape is a wire-shaped ruler or a tape-shaped ruler that is made of invar alloy steel with a very small temperature expansion coefficient. A common wire-shaped ruler has a length of 24 meters and a wire diameter of 1.65 millimeters. Each of two ends of the wire-shaped ruler is connected to a reglette graduated in millimeters, and a scale for the reglette is 80 millimeters. During distance measurement, extension is performed using a counter weight weighing 10 kilograms and a pulley such that the ruler forms a shape of a catenary. A linear distance between scale marks with a same name on the reglettes at the two ends of the wire-shaped ruler is a chord length of the catenary, and is a working length of the wire-shaped ruler. Temperature changes have little impact on an invar baseline tape, and precision of distance measurement using an invar baseline tape is up to 1/1000000. An invar baseline tape is mainly configured to measure a baseline of a triangulation network and another high-precision side length.

(2) Distance Measurement by Means of Stadia.

A method for measuring a distance between two points using a measuring instrument equipped with a stadia apparatus according to principles of optics and trigonometry is used. Generally, a theodolite, a surveying panel, a level gauge and a ruler with scale marks are used for measurement. Positions of two stadia wires of a telescope on a vertically erected ruler are observed. An interval between the stadia wires on the ruler is referred to as a ruler interval or a stadia reading, and a distance between an instrument and the ruler is a function of a ruler interval. For most instruments, a ratio of the distance to the ruler interval is designed as 100. Precision of stadia measurement may reach 1/300 to 1/400.

(3) Distance Measurement by Means of a Subtense Method.

A horizontal angle (that is, a parallactic angle) opposite a fixed-length baseline horizontal ruler is measured using a theodolite, and a horizontal distance between an instrument and a baseline is calculated using a trigonometric formula. The ruler is equipped with a water level and a sighting device in order to place the horizontal ruler horizontally and make a ruler surface perpendicular to a measuring line. Precision of distance measurement by means of a subtense method is relatively low.

(4) Electromagnetic Distance Measurement.

In the 1940s, an electromagnetic distance measuring instrument emerges. When an object dimension is measured using the instrument, a measurement range is relatively large, precision of distance measurement is high, and working efficiency is high.

However, in the other approaches, special measuring tools are required in distance measurement, and the measuring tools are not portable and not available to everyone. Therefore, in a case in which there is no special measuring tool, an object dimension cannot be measured accurately.

SUMMARY

Embodiments of the present disclosure provide an object dimension measurement method and apparatus such that an object dimension can be accurately measured without using a special measuring tool.

To resolve the foregoing technical problem, the embodiments of the present disclosure disclose the following technical solutions.

According to a first aspect, an object dimension measurement method is provided, including obtaining a horizontal distance between a photographing terminal and a photographed object or a vertical distance between the photographing terminal and a horizontal plane, obtaining a camera imaging angle when the photographing terminal photographs the photographed object, calculating a deflection angle of a camera in a vertical direction when the photographing terminal photographs the photographed object, obtaining through calculation an imaging distance of the photographed object on a display screen of the photographing terminal according to a trigonometric relationship among the horizontal distance or the vertical distance, the camera imaging angle, the deflection angle, and the imaging distance, and obtaining through conversion an actual dimension of the photographed object according to the imaging distance.

With reference to the foregoing first aspect, in a first possible implementation manner, obtaining through calculation an imaging distance of the photographed object on a display screen of the photographing terminal according to a trigonometric relationship among the horizontal distance, the camera imaging angle, the deflection angle, and the imaging distance when the photographed object is placed at a ground location, and the photographing terminal photographs the photographed object with one focal length in landscape mode, includes obtaining an imaging width according to the following trigonometric relationship:

imaging width=2×S×tan(α/2)/cosβ, where S is the horizontal distance, α is the camera imaging angle, and β is the deflection angle.

With reference to the foregoing first aspect, in a second possible implementation manner, obtaining through calculation an imaging distance of the photographed object on a display screen of the photographing terminal according to a trigonometric relationship among the horizontal distance, the camera imaging angle, the deflection angle, and the imaging distance when the photographing terminal photographs the photographed object with one focal length in portrait mode, and an image of the ground is located at the bottom of the display screen, includes obtaining an imaging height according to the following trigonometric relationship:

$$\text{imaging height} = S \times (\tan(\beta + (\alpha/2)) + \cot(90 + \beta - (\alpha/2)),$$

where S is the horizontal distance, $\alpha$ is the camera imaging angle, and $\beta$ is a deflection angle when the ground location is photographed.

With reference to the foregoing first aspect, in a third possible implementation manner, obtaining through calculation an imaging distance of the photographed object on a display screen of the photographing terminal according to a trigonometric relationship among the vertical distance, the camera imaging angle, the deflection angle, and the imaging distance when the photographed object is placed at a ground location, and the photographing terminal photographs the photographed object with one focal length in landscape mode, includes obtaining an imaging width according to the following trigonometric relationship:

$$\text{imaging width} = 2 \times h \times \tan(\alpha/2)/\sin\beta,$$

where h is the vertical distance, $\alpha$ is the camera imaging angle, and $\beta$ is the deflection angle.

With reference to the foregoing first aspect, in a fourth possible implementation manner, obtaining through calculation an imaging distance of the photographed object on a display screen of the photographing terminal according to a trigonometric relationship among the vertical distance, the camera imaging angle, the deflection angle, and the imaging distance when the photographed object is placed at a non-ground location, and the photographing terminal photographs the photographed object with one focal length in landscape mode, includes obtaining an imaging width according to the following trigonometric relationship:

$$\text{imaging width} = 2 \times \tan(\alpha/2)/(\sin\beta_1 \times (\cos(\beta_1 - \beta_2) + \sin(\beta_1 - \beta_2) \times \cot(90 - \beta_1)))$$

where h is the vertical distance, $\alpha$ is the camera imaging angle, $\beta_1$ is a deflection angle when a ground location under the photographed object is photographed, and $\beta_2$ is a deflection angle when the photographed object is photographed.

With reference to the foregoing first aspect, in a fifth possible implementation manner, obtaining through calculation an imaging distance of the photographed object on a display screen of the photographing terminal according to a trigonometric relationship among the vertical distance, the camera imaging angle, the deflection angle, and the imaging distance when the photographing terminal photographs the photographed object with one focal length in portrait mode, and an image of the ground is located at the bottom of the display screen, includes obtaining an imaging height according to the following trigonometric relationship:

$$\text{imaging height} = h \times (1 + \tan(\beta + (\alpha/2)) \times \tan(90 + \beta - (\alpha/2))),$$

where h is the vertical distance, $\alpha$ is the camera imaging angle, and $\beta$ is a deflection angle when the ground location is photographed.

With reference to the first aspect and the first to the fifth possible implementation manners, in a sixth possible implementation manner, obtaining through conversion an actual dimension of the photographed object according to the imaging distance includes obtaining a ratio of the imaging distance to a dimension of a long side of the display screen, and using a product of the imaging distance and the ratio as the actual dimension of the photographed object.

According to a second aspect, an object dimension measurement apparatus is provided, including a photographing distance obtaining module configured to obtain a horizontal distance between a photographing terminal and a photographed object or a vertical distance between the photographing terminal and a horizontal plane, a camera imaging angle obtaining unit configured to obtain a camera imaging angle when the photographing terminal photographs the photographed object, a deflection angle calculation unit configured to calculate a deflection angle of the photographing terminal in a vertical direction during photographing, an imaging distance calculation module configured to obtain through calculation an imaging distance of the photographed object on a display screen of the photographing terminal according to a trigonometric relationship among the horizontal distance or the vertical distance, the camera imaging angle, the deflection angle, and the imaging distance, and a conversion module configured to obtain through conversion an actual dimension of the photographed object according to the imaging distance.

With reference to the foregoing second aspect, in a first possible implementation manner, when the photographed object is placed at a ground location, and the photographing terminal photographs the photographed object with one focal length in landscape mode, the imaging distance calculation module obtains an imaging width according to the following trigonometric relationship:

$$\text{imaging width} = 2 \times S \times \tan(\alpha/2)/\cos\beta,$$

where S is the horizontal distance, $\alpha$ is the camera imaging angle, and $\beta$ is the deflection angle.

With reference to the foregoing second aspect, in a second possible implementation manner, when the photographing terminal photographs the photographed object with one focal length in portrait mode, and an image of the ground is located at the bottom of the display screen, the imaging distance calculation module obtains an imaging height according to the following trigonometric relationship:

$$\text{imaging height} = S \times (\tan(\beta + (\alpha/2)) + \cot(90 + \beta(\alpha/2)))$$

where S is the horizontal distance, $\alpha$ is the camera imaging angle, and $\beta$ is a deflection angle when the ground location is photographed.

With reference to the foregoing second aspect, in a third possible implementation manner, when the photographed object is placed at a ground location, and the photographing terminal photographs the photographed object with one focal length in landscape mode, the imaging distance calculation module obtains an imaging width according to the following trigonometric relationship:

$$\text{imaging width} = 2 \times h \times \tan(\alpha/2)/\sin\beta,$$

where h is the vertical distance, $\alpha$ is the camera imaging angle, and $\beta$ is the deflection angle.

With reference to the foregoing second aspect, in a fourth possible implementation manner, when the photographed object is placed at a non-ground location, and the photographing terminal photographs the photographed object with one focal length in landscape mode, the imaging distance calculation module obtains an imaging width according to the following trigonometric relationship:

$$\text{imaging width} = 2h \times \tan(\alpha/2)/(\sin\beta_1 \times (\cos(\beta_1 - \beta_2) + \sin(\beta_1 - \beta_2) \times \cot(90 - \beta_1))),$$

where h is the vertical distance, $\alpha$ is the camera imaging angle, $\beta_1$ is a deflection angle when a ground location under the photographed object is photographed, and $\beta_2$ is a deflection angle when the photographed object is photographed.

With reference to the foregoing second aspect, in a fifth possible implementation manner, when the photographing terminal photographs the photographed object with one focal length in portrait mode, and an image of the ground is located at the bottom of the display screen, the imaging distance calculation module obtains an imaging height according to the following trigonometric relationship:

imaging height=$h \times (1+\tan(\beta+(\alpha/2)) \times \tan(90+\beta-(\alpha/2)))$, where h is the vertical distance, $\alpha$ is the camera imaging angle, and $\beta$ is a deflection angle when the ground location is photographed.

With reference to the foregoing second aspect and the first to the fifth possible implementation manners, in a sixth possible implementation manner, the conversion module includes a ratio obtaining unit configured to obtain a ratio of the imaging distance to a dimension of a long side of the display screen, and an actual dimension calculation unit configured to use a product of the imaging distance and the ratio as the actual dimension of the photographed object.

According to a third aspect, an object dimension measurement apparatus is provided, including a processor and a memory, where the memory is configured to store a computer execution instruction, and the processor is configured to execute the computer execution instruction stored in the memory, obtain a horizontal distance between a photographing terminal and a photographed object or a vertical distance between the photographing terminal and a horizontal plane, obtain a camera imaging angle when the photographing terminal photographs the photographed object, calculate a deflection angle of the photographing terminal in a vertical direction during photographing, obtain through calculation an imaging distance of the photographed object on a display screen of the photographing terminal according to a trigonometric relationship among the horizontal distance or the vertical distance, the camera imaging angle, the deflection angle, and the imaging distance, and obtain through conversion an actual dimension of the photographed object according to the imaging distance.

In the embodiments of the present disclosure, an actual dimension of a photographed object can be obtained through calculation using only a photographing terminal for everyday carry instead of a special measuring tool. Further, an object to be measured is photographed using a photographing terminal, an image of the photographed object is obtained, a specific dimension of the image on a display screen of the photographing terminal can be obtained through calculation according to a trigonometric relationship among a horizontal distance between the photographing terminal and the photographed object or a vertical distance between the photographing terminal and a horizontal plane, a camera imaging angle, a deflection angle of the photographing terminal, and an imaging distance of the photographed object on the display screen, and then, an actual dimension of the photographed object is obtained through conversion according to the dimension of the image and a conversion rule. Because only a photographing terminal for everyday carry (such as a mobile phone or a tablet computer) instead of a conventional special measuring tool is required, an operation in an entire measurement process is simple and practicable, thereby greatly improving convenience of distance measurement.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1:
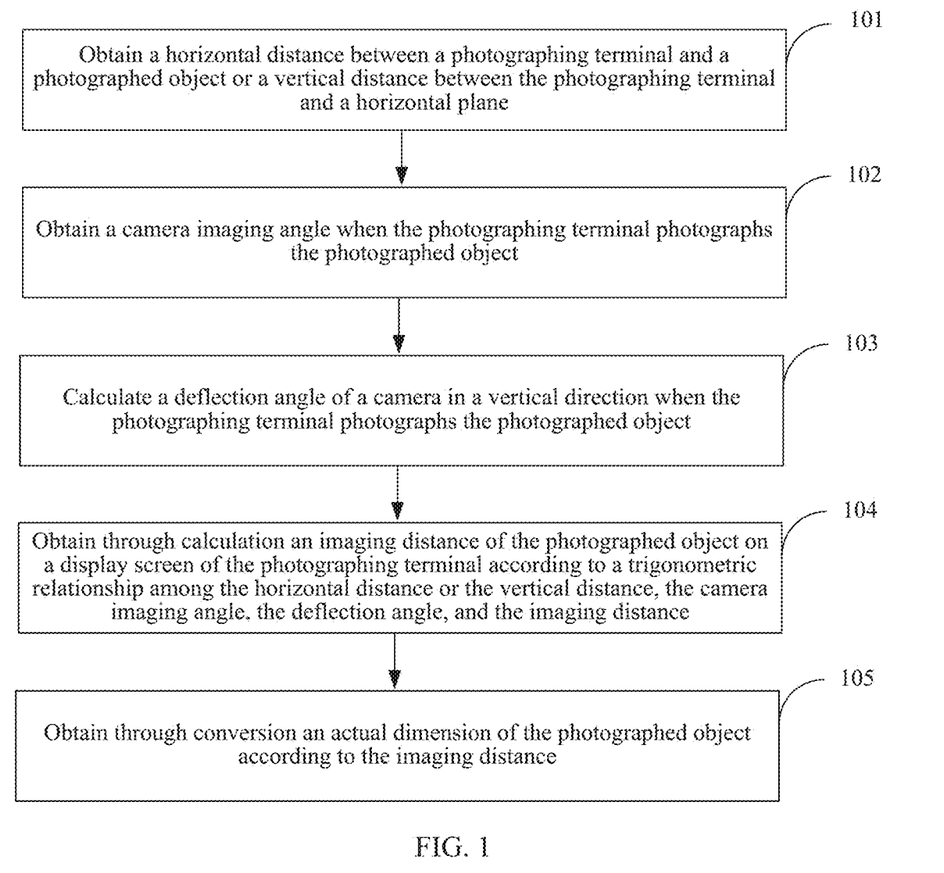
FIG. 1 is a schematic flowchart of an embodiment of an object dimension measurement method according to the present disclosure.

FIG. 1 shows an embodiment of an object dimension measurement method according to the present disclosure. The method may include the following execution steps.

Step 101: Obtain a horizontal distance between a photographing terminal and a photographed object or a vertical distance between the photographing terminal and a horizontal plane.

In this embodiment of the present disclosure, a photographing terminal may be a portable smart mobile terminal that can photograph, including a mobile phone, a tablet computer, a laptop computer, or the like. It should be noted that, in the present disclosure, a distance that is finally measured is actually an actual dimension of a photographed object, and may include an actual height or width of the photographed object.

In a process of object dimension measurement, a horizontal distance between a photographing terminal and a photographed object or a vertical distance between the photographing terminal and a horizontal plane needs to be obtained. The horizontal distance is a linear distance between a projected point of the photographing terminal on a horizontal plane on which the photographed object is located and the photographed object. For example, when a user holds a camera phone in hand and photographs an object that is placed on the distant ground, a horizontal distance between the camera phone and the object on the ground is a linear distance between a location of a foot of the user on the ground and the object. In this case, a vertical distance between the photographing terminal and a horizontal plane may be estimated according to a height of the user. In normal cases, when photographing using a mobile phone, a user does not hold the mobile phone to a height that is the same as a height of the user, but moves the mobile phone down by a distance relative to the height of the user. Generally, 0.3 may be used as a distance by which the mobile phone is moved down relative to the height of the user.

In this embodiment of the present disclosure, the horizontal distance between the photographing terminal and the photographed object may also be obtained by the user through estimation.

Step 102: Obtain a camera imaging angle when the photographing terminal photographs the photographed object.

A camera imaging angle when the photographing terminal photographs the photographed object needs to be obtained. For the photographing terminal, a camera imaging angle in landscape mode is the same as that in portrait mode. In addition, the camera imaging angle depends on the photographing terminal, and is an intrinsic parameter of the photographing terminal.

Step 103: Calculate a deflection angle of a camera in a vertical direction when the photographing terminal photographs the photographed object.

In this embodiment of the present disclosure, a deflection angle of a camera of the photographing terminal in a vertical direction during photographing further needs to be calculated.

Generally, a gyroscope is disposed in the photographing terminal, and is configured to accurately measure a deflection action of a user. During photographing, when the camera of the photographing terminal is deflected in the vertical direction, a specific deflection angle can be accurately obtained using the built-in gyroscope.

In a specific application scenario, an execution order of step 101 to step 103 is not limited.

Step 104: Obtain through calculation an imaging distance of the photographed object on a display screen of the photographing terminal according to a trigonometric relationship among the horizontal distance or the vertical distance, the camera imaging angle, the deflection angle, and the imaging distance.

In this embodiment of the present disclosure, after the horizontal distance between the photographing terminal and the photographed object or the vertical distance between the photographing terminal and the horizontal plane, the camera imaging angle, and the deflection angle are obtained, a trigonometric relationship among the foregoing parameters and an imaging distance of the photographed object on a display screen of the photographing terminal may be further obtained.

The imaging distance on the display screen of the photographing terminal may be further obtained in a calculation process according to the specific trigonometric relationship, and includes an imaging length or width of the photographed object.

Step 105: Obtain through conversion an actual dimension of the photographed object according to the imaging distance.

In this embodiment of the present disclosure, a conversion rule is preset. After the imaging distance of the photographed object is obtained, an actual dimension of the photographed object may be obtained by converting the imaging distance according to the specific conversion rule. For example, an actual width of the photographed object is obtained through conversion according to an imaging width, or an actual height of the photographed object is obtained through conversion according to an imaging height.

In this embodiment of the present disclosure, an actual dimension of a photographed object can be obtained through calculation using only a photographing terminal for everyday carry instead of a special measuring tool. Further, an object to be measured is photographed using a photographing terminal, an image of the photographed object is obtained, a specific dimension of the image on a display screen of the photographing terminal can be obtained through calculation according to a trigonometric relationship among a horizontal distance between the photographing terminal and the photographed object or a vertical distance between the photographing terminal and a horizontal plane, a camera imaging angle, a deflection angle of the photographing terminal, and an imaging distance of the photographed object on the display screen, and then, an actual dimension of the photographed object is obtained through conversion according to the dimension of the image and a conversion rule. Because only a photographing terminal for everyday carry (such as a mobile phone) instead of a conventional special measuring tool is required, an operation in an entire measurement process is simple and practicable, thereby greatly improving convenience of distance measurement.

Figure 2:
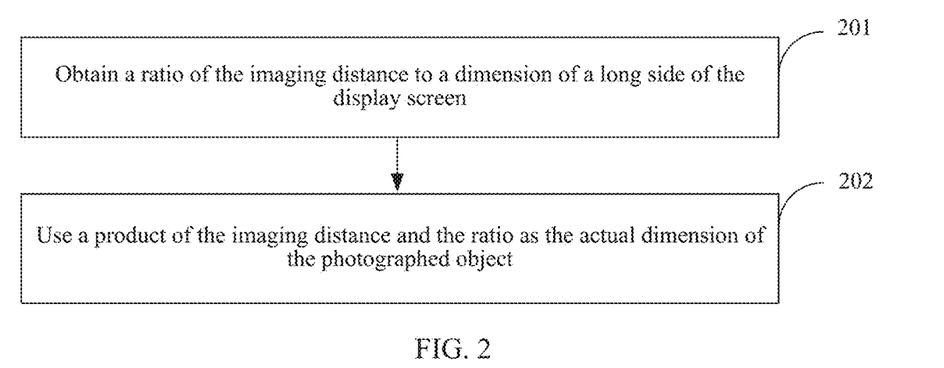
FIG. 2 is a schematic flowchart of implementation of step 105 in FIG. 1.

After the imaging distance is obtained, the actual dimension of the photographed object may be obtained through conversion. In this embodiment of the present disclosure, a specific conversion process is shown in FIG. 2, including the following steps.

Step 201: Obtain a ratio of the imaging distance to a dimension of a long side of the display screen.

Step 202: Use a product of the imaging distance and the ratio as the actual dimension of the photographed object.

Figure 3:
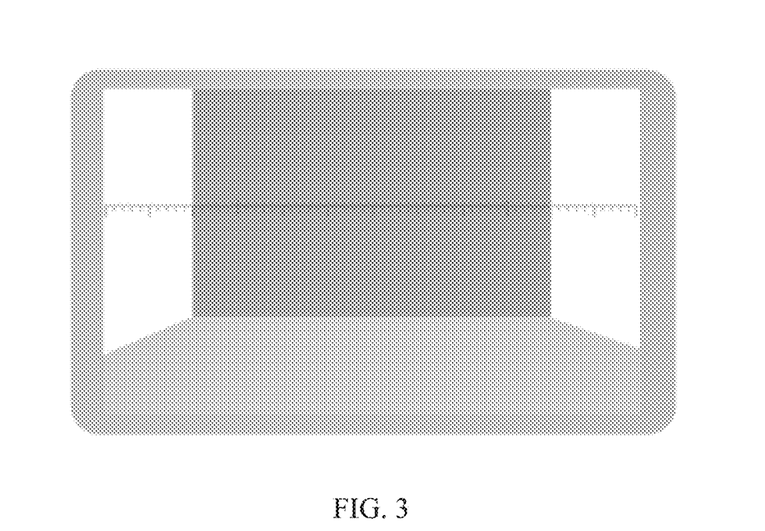
FIG. 3 is a schematic diagram of equal division of a display screen according to an embodiment of the present disclosure.

Generally, the display screen of the photographing terminal is in a rectangular shape. In the foregoing implementation manner, a ratio of the imaging distance on the display screen to a dimension of a long side of the display screen is obtained using the dimension of the long side of the display screen as a standard. A specific manner of obtaining the ratio may include equally dividing the dimension of the long side of the display screen, as shown in FIG. 3. A dividing number may be preset, for example, 100, and may be displayed using a ruler. The ratio of the imaging distance to the dimension of the long side of the display screen may be obtained according to a dividing number of the imaging distance on the ruler. Further, a product obtained by multiplying the imaging distance obtained through calculation and the ratio is the actual dimension of the photographed object.

It should be noted that, in this embodiment of the present disclosure, a focal length of the photographing terminal is generally changeable. For convenience of calculation, when the photographing terminal photographs the photographed object, it may be set in such a manner that one focal length is used. In this way, it can be ensured that a ratio of an object distance to an image distance is 1:1 when the photographing terminal is used to photograph the photographed object, and the imaging distance of the photographed object on the display screen of the photographing terminal may be directly obtained through calculation according to the trigonometric relationship among the horizontal distance or the vertical distance, the camera imaging angle, the deflection angle, and the imaging distance, with no need to add extra trigonometric conversion processes.

The following uses a mobile phone as an example to describe specific implementation manners of the foregoing measurement process in detail using a specific embodiment.

When a user photographs a photographed object using a mobile phone, a focal length of the mobile phone is one focal length, and is generally a default focal length of the mobile phone. Further, the mobile phone may be held in landscape mode or the mobile phone may be held in portrait mode. A final holding manner may be adjusted according to a different area of the photographed object that needs to be measured. For example, when a width of the photographed object needs to be measured, the mobile phone may be held in landscape mode, and the mobile phone may be held in portrait mode when a height of the photographed object needs to be measured. In addition, the photographed object may be directly placed at a ground location, or may be placed at a non-ground location. For different locations at which the photographed object is placed, calculation methods are different.

Figure 4:
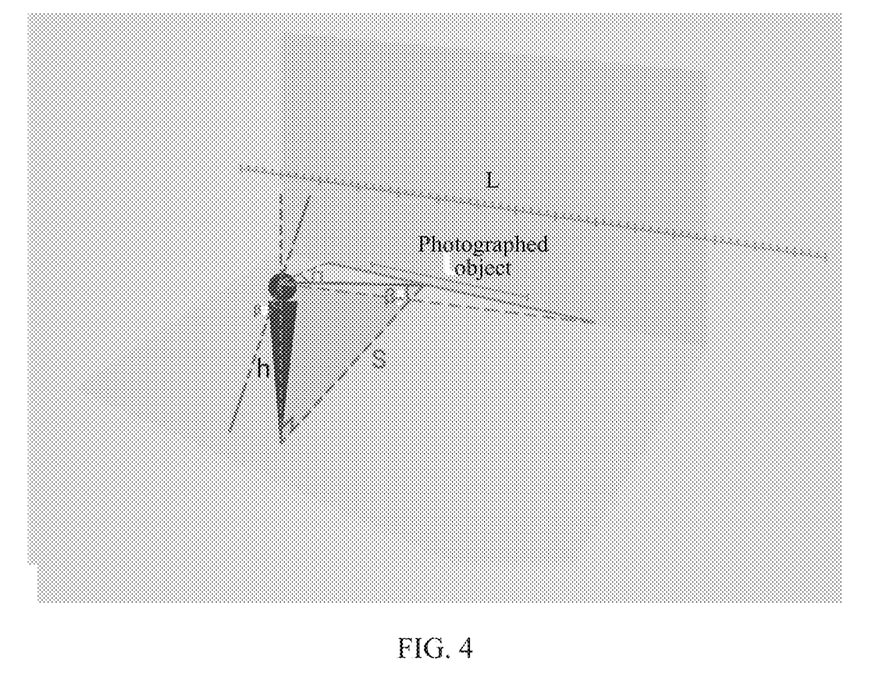
FIG. 4 is a schematic diagram of a trigonometric relationship met in imaging in a first scenario according to the present disclosure.

In a first scenario, the photographed object is placed at a ground location. When the width of the photographed object needs to be measured, the user holds the mobile phone in landscape mode. In this case, a trigonometric relationship between a horizontal distance S between the mobile phone and the photographed object or a vertical distance h between the mobile phone and a horizontal plane, a camera imaging angle α of the mobile phone, a deflection angle β of the mobile phone in a vertical direction, and an imaging width L of the photographed object on a display screen of the mobile phone is shown in FIG. 4.

After the user obtains through estimation the horizontal distance S between the mobile phone and the photographed object, the imaging width of the photographed object may be obtained according to the following trigonometric relationship:

$$L=2\times S\times\tan(\alpha/2)/\cos\beta.$$

In addition, the vertical distance h between the photographing terminal and the horizontal plane may be estimated according to a height of the user. In normal cases, when photographing using the mobile phone, the user does not hold the mobile phone to a height that is the same as the height of the user, but moves the mobile phone down by a distance relative to the height of the user. Generally, 0.3 may be used as a distance by which the mobile phone is moved down relative to the height of the user. In this case, h=the height−0.3. After the user obtains through estimation the vertical distance h between the mobile phone and the horizontal plane, the imaging width of the photographed object may be obtained according to the following trigonometric relationship $$L=2\times h\times\tan(\alpha/2)/\sin\beta.$$

In the foregoing calculation process, the camera imaging angle α of the mobile phone is an intrinsic parameter of the mobile phone, and the deflection angle β of the mobile phone in the vertical direction may be obtained according to a built-in gyroscope of the mobile phone.

Figure 5:
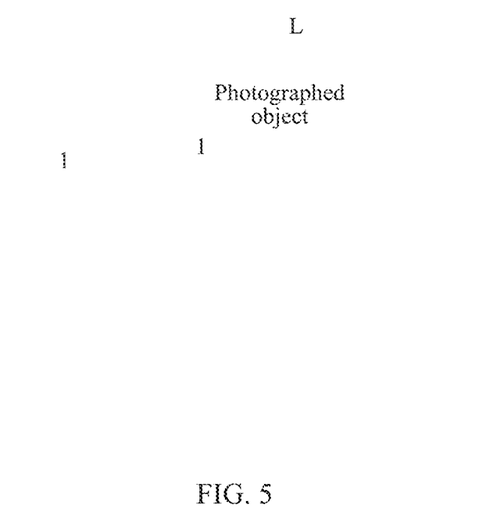
FIG. 5 is a schematic diagram of a deflection angle $\beta_1$ in a second scenario according to the present disclosure.
Figure 6:
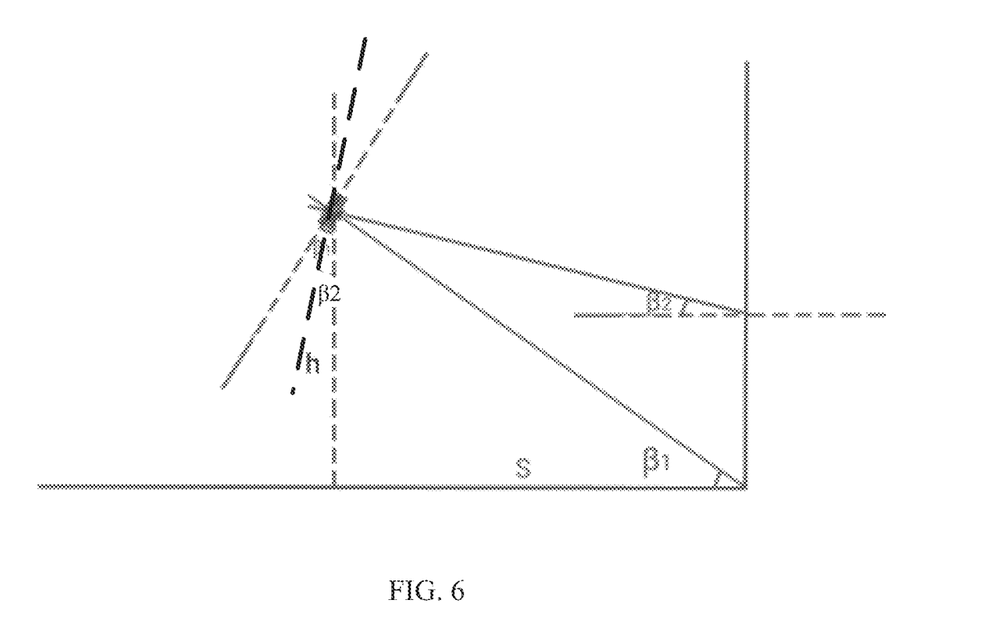
FIG. 6 is a schematic diagram of a deflection angle $\beta_2$ in the second scenario according to the present disclosure.

In a second scenario, the photographed object is placed at a non-ground location, and the user holds the mobile phone in landscape mode to measure the width of the photographed object. In this case, first, a deflection angle $\beta_1$ when the mobile phone photographs a ground location under the photographed object needs to be measured, as shown in FIG. 5, and then, a deflection angle $\beta_2$ when the mobile phone photographs the photographed object is measured, as shown in FIG. 6. After the user obtains through estimation a vertical distance h between the mobile phone and a horizontal plane, an imaging width of the photographed object may be obtained according to the following trigonometric relationship:

$$L=2h\times\tan(\alpha/2)/(\sin\beta_1\times(\cos(\beta_1-\beta_2)+\sin(\beta_1-\beta_2)\times\cot(90-\beta_1))).$$

In the foregoing two scenarios, after the imaging width of the photographed object is obtained, a ratio of the imaging width on a display screen to a dimension of a long side of the display screen may be known according to a uniform scale on the display screen of the mobile phone. For example, the scale is equally divided into 100 parts, and the imaging width occupies 60 parts of the entire scale along the long side of the display screen, and then the ratio is 0.6. Then, an actual width of the photographed object is imaging width L×0.6.

Figure 7:
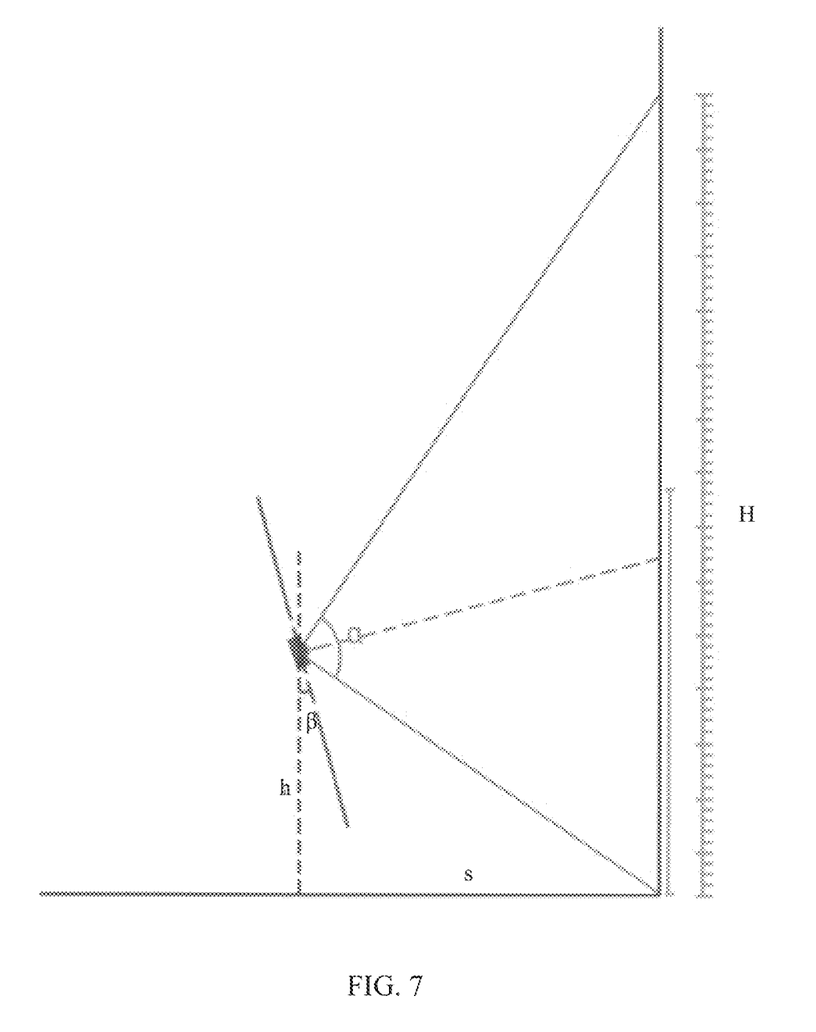
FIG. 7 is a schematic diagram of a trigonometric relationship met in imaging in a third scenario according to the present disclosure.

In a third scenario, when the height of the photographed object needs to be measured, the user holds the mobile phone in portrait mode. In this case, an image on the display screen needs to meet that an image of the ground is located at the bottom of a display screen, that is, the image of the photographed ground on the display screen overlaps the bottom of the display screen. The photographed object whose height is to be measured is directly placed at a ground location or disposed at a location above the ground, which is not limited in the present disclosure. In this scenario, a trigonometric relationship between a horizontal distance S between the mobile phone and the photographed object or a vertical distance h between the mobile phone and a horizontal plane, a camera imaging angle α of the mobile phone, a deflection angle β of the mobile phone in a vertical direction, and an imaging height H of the photographed object on the display screen of the mobile phone is shown in FIG. 7.

After the user obtains through estimation the horizontal distance S between the mobile phone and the photographed object, the height H of the photographed object may be obtained according to the following trigonometric relationship:

$$H=S\times(\tan(\beta+(\alpha/2))+\cot(90+\beta-(\alpha/2))).$$

In addition, the vertical distance h between the photographing terminal and the horizontal plane may be estimated according to a height of the user. In normal cases, when photographing using the mobile phone, the user does not hold the mobile phone to a height that is the same as the height of the user, but moves the mobile phone down by a distance relative to the height of the user. Generally, 0.3 may be used as a distance by which the mobile phone is moved down relative to the height of the user. In this case, h=the height−0.3. After the user obtains through estimation the vertical distance h between the mobile phone and the horizontal plane, the imaging height of the photographed object may be obtained according to the following trigonometric relationship:

$$H=h\times(1+\tan(\beta+(\alpha/2))\times\tan(90+\beta-(\alpha/2))).$$

Similarly, after the imaging height of the photographed object is obtained, a ratio of the imaging height on the display screen to a dimension of a long side of the display screen may be known according to a uniform scale on the display screen of the mobile phone. For example, the scale is equally divided into 100 parts, and the imaging height occupies 60 parts of the entire scale along the long side of the display screen, and then the ratio is 0.6. Then, an actual height of the photographed object is imaging height H×0.6.

Corresponding to the embodiment of the object dimension measurement method, the present disclosure provides an object dimension measurement apparatus.

Figure 8:
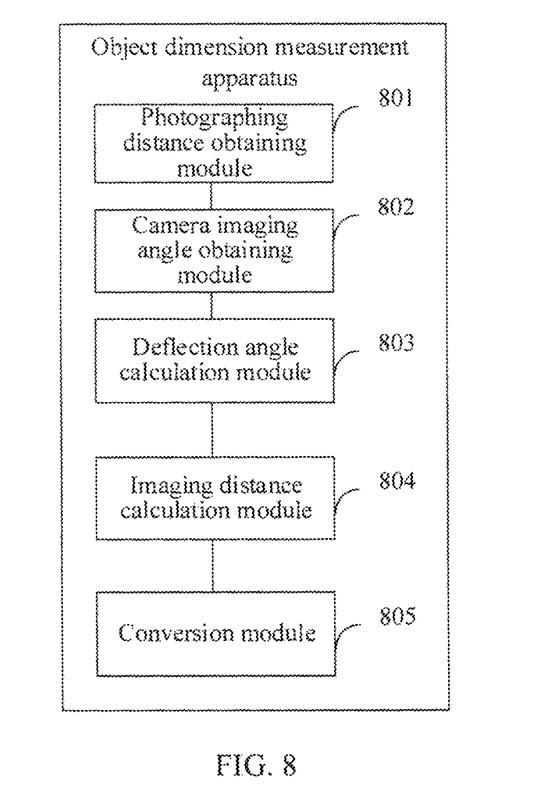
FIG. 8 is a schematic structural diagram of an object dimension measurement apparatus according to an embodiment of the present disclosure.

FIG. 8 shows an embodiment of an object dimension measurement apparatus according to the present disclosure. In a specific application scenario, the object dimension measurement apparatus may be a function module in a portable smart mobile terminal, or may be a portable smart mobile terminal. The apparatus may include a photographing distance obtaining module 801 configured to obtain a horizontal distance between a photographing terminal and a photographed object or a vertical distance between the photographing terminal and a horizontal plane, a camera imaging angle obtaining module 802 configured to obtain a camera imaging angle when the photographing terminal photographs the photographed object, a deflection angle calculation module 803 configured to calculate a deflection angle of a camera in a vertical direction when the photographing terminal photographs the photographed object, an imaging distance calculation module 804 configured to obtain through calculation an imaging distance of the photographed object on a display screen of the photographing terminal according to a trigonometric relationship among the horizontal distance or the vertical distance, the camera imaging angle, the deflection angle, and the imaging distance, and a conversion module 805 configured to obtain through conversion an actual dimension of the photographed object according to the imaging distance.

In the foregoing apparatus embodiment, in a process of distance measurement, a horizontal distance between a photographing terminal and a photographed object or a vertical distance between the photographing terminal and a horizontal plane needs to be obtained using the photographing distance obtaining module 801. The horizontal distance is a linear distance between a projected point of the photographing terminal on a horizontal plane on which the photographed object is located and the photographed object. For example, when a user holds a camera phone in hand and photographs an object that is placed on the distant ground, a horizontal distance between the camera phone and the object on the ground is a linear distance between a location of a foot of the user on the ground and the object. In this case, a vertical distance between the photographing terminal and a horizontal plane may be estimated according to a height of the user. In normal cases, when photographing using a mobile phone, a user does not hold the mobile phone to a height that is the same as a height of the user, but moves the mobile phone down by a distance relative to the height of the user. Generally, 0.3 may be used as a distance by which the mobile phone is moved down relative to the height of the user. The horizontal distance between the photographing terminal and the photographed object may also be obtained by the user through estimation.

For the photographing terminal, a camera imaging angle in landscape mode is the same as that in portrait mode. In addition, the camera imaging angle depends on the photographing terminal, and is an intrinsic parameter of the photographing terminal.

Further, a deflection angle of the photographing terminal in a vertical direction during photographing needs to be further calculated using the deflection angle calculation module 803. Generally, a gyroscope is disposed in the photographing terminal, and is configured to accurately measure a deflection action of the user. During photographing, when the photographing terminal is deflected in the vertical direction, a specific deflection angle can be accurately obtained using the built-in gyroscope.

After the horizontal distance between the photographing terminal and the photographed object or the vertical distance between the photographing terminal and the horizontal plane, the camera imaging angle, and the deflection angle are obtained, the imaging distance calculation module 804 may obtain a trigonometric relationship among the foregoing parameters and an imaging distance of the photographed object on a display screen of the photographing terminal. The imaging distance on the display screen of the photographing terminal may be further obtained in a calculation process according to the specific trigonometric relationship, and includes an imaging length or width of the photographed object.

In this embodiment of the present disclosure, a conversion rule is preset in the object dimension measurement apparatus. After the imaging distance of the photographed object is obtained, an actual dimension of the photographed object may be obtained by converting, by the conversion module 805, the imaging distance according to the specific conversion rule. For example, an actual width of the photographed object is obtained through conversion according to an imaging width, or an actual height of the photographed object is obtained through conversion according to an imaging height.

In this embodiment of the present disclosure, an actual dimension of a photographed object can be obtained through calculation using only a photographing terminal for everyday carry instead of a special measuring tool. Further, an object to be measured is photographed using a photographing terminal, an image of the photographed object is obtained, a specific dimension of the image on a display screen of the photographing terminal can be obtained through calculation according to, a trigonometric relationship among a horizontal distance between the photographing terminal and the photographed object or a vertical distance between the photographing terminal and a horizontal plane, a camera imaging angle, a deflection angle of the photographing terminal, and an imaging distance of the photographed object on the display screen, and then, an actual dimension of the photographed object is obtained through conversion according to the dimension of the image and a conversion rule. Because only a photographing terminal for everyday carry (such as a mobile phone) instead of a conventional special measuring tool is required, an operation in an entire measurement process is simple and practicable, thereby greatly improving convenience of distance measurement.

Figure 9:
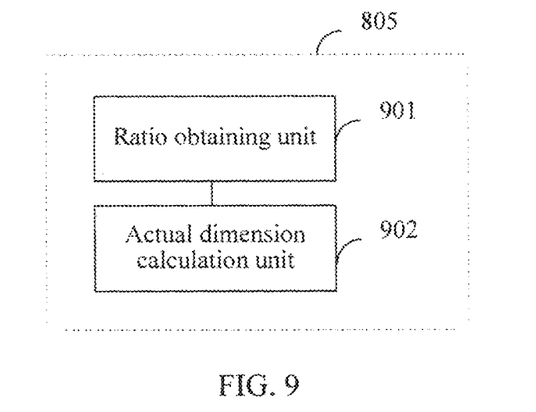
FIG. 9 is a schematic structural diagram of a conversion module in FIG. 8.

In a preferred embodiment provided by the present disclosure, as shown in FIG. 9, the foregoing conversion module 805 includes a ratio obtaining unit 901 configured to obtain a ratio of the imaging distance to a dimension of a long side of the display screen, and an actual dimension calculation unit 902 configured to set a product of the imaging distance and the ratio as the actual dimension of the photographed object.

Generally, the display screen of the photographing terminal is in a rectangular shape. In the implementation manner, a ratio of the imaging distance on the display screen to a dimension of a long side of the display screen is obtained using the dimension of the long side of the display screen as a standard. A specific manner of obtaining the ratio may be equally dividing the dimension of the long side of the display screen. A dividing number may be preset, for example, 100, and may be displayed using a ruler. The ratio of the imaging distance to the dimension of the long side of the display screen may be obtained according to a dividing number of the imaging distance on the ruler. Further, a product obtained by multiplying the imaging distance obtained through calculation and the ratio is the actual dimension of the photographed object.

For convenience of calculation, a camera imaging angle when the photographing terminal photographs the photographed object with one focal length needs to be obtained using the camera imaging angle obtaining unit. In addition, when photographing the photographed object using the photographing terminal, the user may hold the photographing terminal in landscape mode or may hold the photographing terminal in portrait mode. A specific holding manner may be adjusted according to a different area of the photographed object that needs to be measured. For example, when a width of the photographed object needs to be measured, the photographing terminal may be held in landscape mode, when a height of the photographed object needs to be measured, the photographing terminal may be held in portrait mode. In addition, the photographed object may be directly placed at a ground location, or may be placed at a non-ground location. For different locations at which the photographed object is placed, calculation methods are different. In the following scenarios, a calculation manner in which the photographing terminal uses one focal length is used.

Further, in a scenario, the photographed object is placed at a ground location. When the width of the photographed object needs to be measured, the user may hold the photographing terminal in landscape mode. In this case, a horizontal distance between the photographing terminal and the photographed object is S, a vertical distance between the photographing terminal and a horizontal plane is h, a camera imaging angle of the photographing terminal is $\alpha$, and a deflection angle of the photographing terminal in a vertical direction is $\beta$. The foregoing parameters and an imaging width L of the photographed object on a display screen of the photographing terminal meets a particular trigonometric relationship.

After the user obtains through estimation the horizontal distance S between the photographing terminal and the photographed object, the imaging width of the photographed object may be obtained according to the following trigonometric relationship:

$$L=2\times S\times\tan(\alpha/2)/\cos\beta.$$

In addition, the vertical distance h between the photographing terminal and the horizontal plane may be estimated according to a height of the user. In normal cases, when photographing using the photographing terminal, the user does not hold the photographing terminal to a height that is the same as the height of the user, but moves the photographing terminal down by a distance relative to the height of the user. Generally, 0.3 may be used as a distance by which the photographing terminal is moved down relative to the height of the user. In this case, h=the height−0.3. After the user obtains through estimation the vertical distance h between the photographing terminal and the horizontal plane, the imaging width of the photographed object may be obtained according to the following trigonometric relationship:

$$L=2\times h\times\tan(\alpha/2)/\sin\beta.$$

In the foregoing calculation process, the camera imaging angle $\alpha$ of the photographing terminal is an intrinsic parameter of the photographing terminal, and the deflection angle $\beta$ of the photographing terminal in the vertical direction may be obtained according to a built-in gyroscope of the photographing terminal.

In another scenario, the photographed object is located at a non-ground location, and the user holds the photographing terminal in landscape mode to measure the width of the photographed object. In this case, first, a deflection angle $\beta_1$ when the photographing terminal photographs a ground location under the photographed object needs to be measured, and then, a deflection angle $\beta_2$ when the photographing terminal photographs the photographed object is measured. After the user obtains through estimation a vertical distance h between the photographing terminal and a horizontal plane, an imaging width of the photographed object may be obtained according to the following trigonometric relationship:

$$L=2h\times\tan(\alpha/2)/(\sin\beta_1\times(\cos(\beta_1-\beta_2)+\sin(\beta_1-\beta_2)\times\cot(90-\beta_1))).$$

In the foregoing two scenarios, after the imaging width of the photographed object is obtained, a ratio of the imaging width on a display screen to a dimension of a long side of the display screen may be known according to a uniform scale on the display screen of the photographing terminal. Then, an actual width of the photographed object is a product of the imaging width L and the ratio.

In still another scenario, when the height of the photographed object needs to be measured, the user holds the photographing terminal in portrait mode. In this case, an image on the display screen needs to meet that an image of the ground is located at the bottom of a display screen, that is, the image of the photographed ground on the display screen overlaps the bottom of the display screen. The photographed object whose height is to be measured is directly placed at a ground location or disposed at a location above the ground, which is not limited in the present disclosure. In this scenario, a horizontal distance S between the photographing terminal and the photographed object or a vertical distance h between the photographing terminal and a horizontal plane, a camera imaging angle $\alpha$ of the photographing terminal, a deflection angle $\beta$ of the photographing terminal in a vertical direction, and an imaging height H of the photographed object on the display screen of the photographing terminal meet another trigonometric relationship.

After the user obtains through estimation the horizontal distance S between the photographing terminal and the photographed object, the height H of the photographed object may be obtained according to the following trigonometric relationship:

$$H=S\times(\tan(\beta+(\alpha/2))+\cot(90+\beta-(\alpha/2))).$$

In addition, the vertical distance h between the photographing terminal and a horizontal plane may be estimated according to a height of the user. Generally, 0.3 may be used as a distance by which the photographing terminal is moved down relative to the height of the user. In this case, h=the height−0.3. After the user obtains through estimation the vertical distance h between the photographing terminal and the horizontal plane, the imaging height of the photographed object may be obtained according to the following trigonometric relationship:

$$H=h\times(1+\tan(\beta+(\alpha/2))\times\tan(90+\beta-(\alpha/2))).$$

Similarly, after the imaging height of the photographed object is obtained, a ratio of the imaging height on the display screen to a dimension of a long side of the display screen may be known according to a uniform scale on the display screen of the photographing terminal. Then, an actual height of the photographed object is a product of the imaging height H and the ratio.

Figure 10:
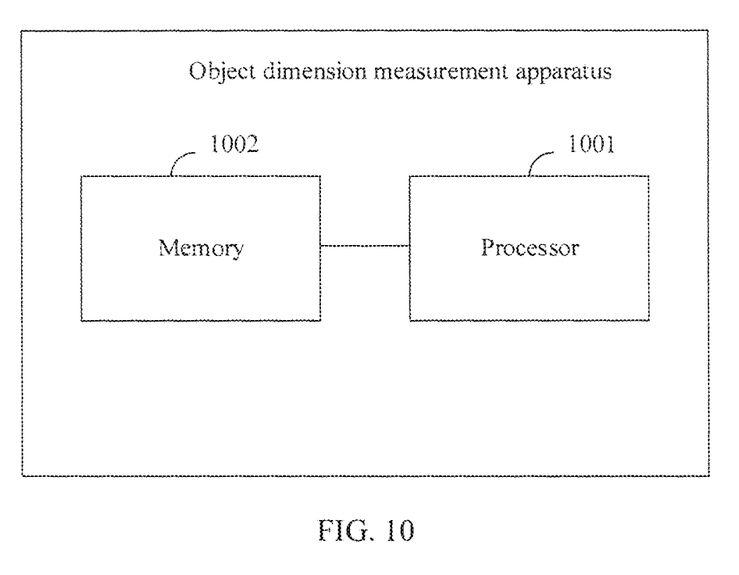
FIG. 10 is a schematic structural diagram of an object dimension measurement apparatus implemented based on a computer system according to the present disclosure.

As shown in FIG. 10, the present disclosure further provides an object dimension measurement apparatus implemented based on a computer system. In a specific implementation, the information notification apparatus may include a processor 1001 and a memory 1002, where the memory 1002 is configured to store a computer execution instruction, and the processor 1001 is configured to execute the computer execution instruction stored in the memory 1002, obtain a horizontal distance between a photographing terminal and a photographed object or a vertical distance between the photographing terminal and a horizontal plane, obtain a camera imaging angle when the photographing terminal photographs the photographed object, calculate a deflection angle of a camera in a vertical direction when the photographing terminal photographs the photographed object, obtain through calculation an imaging distance of the photographed object on a display screen of the photographing terminal according to a trigonometric relationship among the horizontal distance or the vertical distance, the camera imaging angle, the deflection angle, and the imaging distance, and obtain through conversion an actual dimension of the photographed object according to the imaging distance.

In a specific implementation, the processor may be a central processing unit (CPU), an application-specific integrated circuit (ASIC), or the like. A computer storage medium may store a program, and the program may perform some or all of the steps in the embodiments of the data transmission method provided by the embodiments of the present disclosure. The foregoing storage medium may be a magnetic disk, an optical disc, a read-only memory (ROM), a random access memory (RAM), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An object dimension measurement method, comprising:
    photographing, by a photographing terminal using a camera of the photographing terminal, an object to obtain a photographed object;
    obtaining a horizontal distance between the photographing terminal and the photographed object or a vertical distance between the photographing terminal and a horizontal plane;
    obtaining a camera imaging angle of the camera when the photographing terminal photographs the photographed object;
    calculating a deflection angle of the camera in a vertical direction when the photographing terminal photographs the photographed object;
    calculating an imaging distance of the photographed object on a display screen of the photographing terminal according to a trigonometric relationship among the horizontal distance or the vertical distance, the camera imaging angle, the deflection angle, and the imaging distance; and
    obtaining through conversion an actual dimension of the photographed object according to the calculated imaging distance.

2. The method of claim 1, wherein when the photographed object is placed at a ground location and when the photographing terminal photographs the photographed object with one focal length in landscape mode, obtaining the imaging distance of the photographed object comprises obtaining an imaging width according to a trigonometric relationship of imaging width=$2 \times S \times \tan(\alpha/2)/\cos \beta$, wherein S is the horizontal distance, wherein $\alpha$ is the camera imaging angle, and wherein $\beta$ is the deflection angle.

3. The method of claim 1, wherein when the photographing terminal photographs the photographed object with one focal length in portrait mode and when an image of a ground is located at a bottom of the display screen, obtaining the imaging distance of the photographed object comprises obtaining an imaging height according to a trigonometric relationship of imaging height=$S \times (\tan(\beta+(\alpha/2))+\cot(90+\beta-(\alpha/2))$, wherein S is the horizontal distance, wherein $\alpha$ is the camera imaging angle, and wherein $\beta$ is a deflection angle when a ground location is photographed.

4. The method of claim 1, wherein when the photographed object is placed at a ground location and when the photographing terminal photographs the photographed object with one focal length in landscape mode, obtaining the imaging distance of the photographed object comprises obtaining an imaging width according to a trigonometric relationship of imaging width=$2 \times h \times \tan(\alpha/2)/\sin \beta$, wherein h is the vertical distance, wherein $\alpha$ is the camera imaging angle, and wherein $\beta$ is the deflection angle.

5. The method of claim 1, wherein when the photographed object is placed at a non-ground location and when the photographing terminal photographs the photographed object with one focal length in landscape mode, obtaining the imaging distance of the photographed object comprises obtaining an imaging width according to a trigonometric relationship of imaging width=$2h \times \tan(\alpha/2)/(\sin \beta_1 \times (\cos(\beta_1-\beta_2)+\sin(\beta_1-\beta_2) \times \cot(90-\beta_1)))$, wherein h is the vertical distance, wherein $\alpha$ is the camera imaging angle, wherein $\beta_1$ is a deflection angle when a ground location under the photographed object is photographed, and wherein $\beta_2$ is a deflection angle when the photographed object is photographed.

6. The method of claim 1, wherein when the photographing terminal photographs the photographed object with one focal length in portrait mode and when an image of a ground is located at a bottom of the display screen, obtaining the imaging distance of the photographed object comprises obtaining an imaging height according to a trigonometric relationship of imaging height=$h \times (1+\tan((\beta+(\alpha/2)) \times \tan(90+\beta-(\alpha/2)))$, wherein h is the vertical distance, wherein $\alpha$ is the camera imaging angle, and wherein $\beta$ is a deflection angle when a ground location is photographed.

7. The method of claim 1, wherein obtaining the actual dimension of the photographed object comprises:
   obtaining a ratio of the imaging distance to a dimension of a long side of the display screen; and
   setting a product of the imaging distance and the ratio as the actual dimension of the photographed object.

8. A photographing terminal, comprising:
   a camera;
   a memory comprising instructions; and
   a processor coupled to the memory and configured to execute the instructions to cause the photographing terminal to be configured to:
     photograph, using the camera, an object to obtain a photographed object;
     obtain a horizontal distance between the photographing terminal and the photographed object or a vertical distance between the photographing terminal and a horizontal plane;
     obtain a camera imaging angle of the camera when the photographing terminal photographs the photographed object;
     calculate a deflection angle of the camera in a vertical direction when the photographing terminal photographs the photographed object;
     calculate an imaging distance of the photographed object on a display screen of the photographing terminal according to a trigonometric relationship among the horizontal distance or the vertical distance, the camera imaging angle, the deflection angle, and the imaging distance; and
     obtain through conversion an actual dimension of the photographed object according to the imaging distance.

9. The photographing terminal of claim 8, wherein when the photographed object is placed at a ground location and when the photographing terminal photographs the photographed object with one focal length in landscape mode, the instructions further cause the processor to be configured to obtain an imaging width according to a trigonometric relationship of imaging width=$2 \times S \times \tan(\alpha/2)/\cos \beta$, wherein S is the horizontal distance, wherein $\alpha$ is the camera imaging angle, and wherein $\beta$ is the deflection angle.

10. The photographing terminal of claim 8, wherein when the photographing terminal photographs the photographed object with one focal length in portrait mode and when an image of a ground is located at a bottom of the display screen, the instructions further cause the processor to be configured to obtain an imaging height according to a trigonometric relationship of imaging height=$S \times (\tan((\beta+(\alpha/2))+\cot(90+\beta-(\alpha/2)))$, wherein S is the horizontal distance, wherein $\alpha$ is the camera imaging angle, and wherein $\beta$ is a deflection angle when a ground location is photographed.

11. The photographing terminal of claim 8, wherein when the photographed object is placed at a ground location and when the photographing terminal photographs the photographed object with one focal length in landscape mode, the instructions further cause the processor to be configured to obtain an imaging width according to a trigonometric relationship of imaging width=$2 \times h \times \tan(\alpha/2)/\sin \beta$, wherein h is the vertical distance, wherein $\alpha$ is the camera imaging angle, and wherein $\beta$ is the deflection angle.

12. The photographing terminal of claim 8, wherein when the photographed object is placed at a non-ground location and when the photographing terminal photographs the photographed object with one focal length in landscape mode, the instructions further cause the processor to be configured to obtain an imaging width according to a trigonometric relationship of imaging width=$2h \times \tan(\alpha/2)/(\sin \beta_1 \times (\cos(\beta_1-\beta_2)+\sin(\beta_1-\beta_2) \times \cot(90-\beta_1)))$, wherein h is the vertical distance, wherein $\alpha$ is the camera imaging angle, wherein $\beta_1$ is a deflection angle when a ground location under the photographed object is photographed, and wherein $\beta_2$ is a deflection angle when the photographed object is photographed.

13. The photographing terminal of claim 8, wherein when the photographing terminal photographs the photographed object with one focal length in portrait mode and when an image of a ground is located at a bottom of the display screen, the instructions further cause the processor to be configured to obtain an imaging height according to a trigonometric relationship of imaging height=$h \times (1+\tan(\beta+(\alpha/2)) \times \tan(90+\beta-(\alpha/2)))$, wherein h is the vertical distance, wherein $\alpha$ is the camera imaging angle, and wherein $\beta$ is a deflection angle when a ground location is photographed.

14. The photographing terminal of claim 8, wherein the instructions further cause the processor to be configured to:
   obtain a ratio of the imaging distance to a dimension of a long side of the display screen; and
   set a product of the imaging distance and the ratio as the actual dimension of the photographed object.

15. A non-transitory computer-readable storage medium comprising instructions which, when executed by a computer, cause a photographing terminal including a camera to:
   photograph, using the camera, an object to obtain a photographed object;
   obtain a horizontal distance between the photographing terminal and the photographed object or a vertical distance between the photographing terminal and a horizontal plane;
   obtain a camera imaging angle of the camera when the photographing terminal photographs the photographed object;
   calculate a deflection angle of the camera in a vertical direction when the photographing terminal photographs the photographed object;
   calculate an imaging distance of the photographed object on a display screen of the photographing terminal according to a trigonometric relationship among the horizontal distance or the vertical distance, the camera imaging angle, the deflection angle, and the imaging distance; and
   obtain through conversion an actual dimension of the photographed object according to the imaging distance.

16. The non-transitory computer-readable storage medium of claim 15, wherein when the photographed object is placed at a ground location and when the photographing terminal photographs the photographed object with one focal length in landscape mode, obtaining the imaging distance of the photographed object comprises obtaining an imaging width according to a trigonometric relationship of imaging width=$2 \times S \times \tan(\alpha/2)/\cos \beta$, wherein S is the horizontal distance, wherein $\alpha$ is the camera imaging angle, and wherein $\beta$ is the deflection angle.

17. The non-transitory computer readable storage medium of claim 15, wherein when the photographing terminal photographs the photographed object with one focal length in portrait mode and when an image of a ground is located at a bottom of the display screen, obtaining the imaging distance of the photographed object comprises obtaining an imaging height according to a trigonometric relationship of imaging height=$S \times (\tan(\beta+(\alpha/2))+\cot(90+\beta-(\alpha/2))$, wherein S is the horizontal distance, wherein $\alpha$ is the camera imaging angle, and wherein $\beta$ is a deflection angle when a ground location is photographed.

18. The non-transitory computer readable storage medium of claim 15, wherein when the photographed object is placed at a ground location and when the photographing terminal photographs the photographed object with one focal length in landscape mode, obtaining the imaging distance of the photographed object comprises obtaining an imaging width according to a trigonometric relationship of imaging width=$2 \times h \times \tan(\alpha/2)/\sin \beta$, wherein h is the vertical distance, wherein $\alpha$ is the camera imaging angle, and wherein $\beta$ is the deflection angle.

19. The non-transitory computer readable storage medium of claim 15, wherein when the photographed object is placed at a non-ground location and when the photographing terminal photographs the photographed object with one focal length in landscape mode, obtaining the imaging distance of the photographed object comprises obtaining an imaging width according to the following trigonometric relationship of imaging width=$2h \times \tan(\alpha/2)/(\sin \beta_1 \times (\cos(\beta_1-\beta_2)+\sin(\beta_1-\beta_2) \times \cot(90-\beta_1)))$, wherein h is the vertical distance, wherein $\alpha$ is the camera imaging angle, wherein $\beta_1$ is a deflection angle when a ground location under the photographed object is photographed, and wherein $\beta_2$ is a deflection angle when the photographed object is photographed.

* * * * *